United States Patent [19]

Kousa

[11] Patent Number: 4,797,672
[45] Date of Patent: Jan. 10, 1989

[54] VOICE NETWORK SECURITY SYSTEM

[75] Inventor: Paavo T. Kousa, Campbell, Calif.

[73] Assignee: Octel Communications Corp., Milpitas, Calif.

[21] Appl. No.: 904,085

[22] Filed: Sep. 4, 1986

[51] Int. Cl.[4] .............................................. H04L 9/02
[52] U.S. Cl. ............................... 340/825.300; 380/46; 380/47
[58] Field of Search ........... 340/825.3, 825.31, 825.33, 340/825.34; 380/42–48

[56] References Cited

U.S. PATENT DOCUMENTS

| | | | |
|---|---|---|---|
| 4,349,695 | 9/1982 | Morgan et al. | 340/825.34 |
| 4,484,027 | 11/1984 | Lee et al. | 380/46 |
| 4,503,287 | 3/1985 | Morris et al. | 380/45 |
| 4,578,532 | 3/1986 | Markwitz | 380/43 |
| 4,605,820 | 8/1986 | Cambell, Jr. | 380/45 |
| 4,633,037 | 12/1986 | Serpell | 380/47 |
| 4,634,808 | 1/1987 | Moerder | 380/45 |
| 4,672,533 | 6/1987 | Noble et al. | 340/825.34 |

Primary Examiner—Donald J. Yusko
Attorney, Agent, or Firm—Flehr, Hohbach, Test, Albritton & Herbert

[57] ABSTRACT

A voice network security system is disclosed which provides improved security aspects in transmitting voice messages between remote locations for use in a business environment. The security aspects of the present invention serve to prevent unauthorized access to the transmitted messages.

A microfiche appendix (A) of one microfiche and 41 frames is included as part of the specification (3 CFR 1.96b).

3 Claims, 14 Drawing Sheets

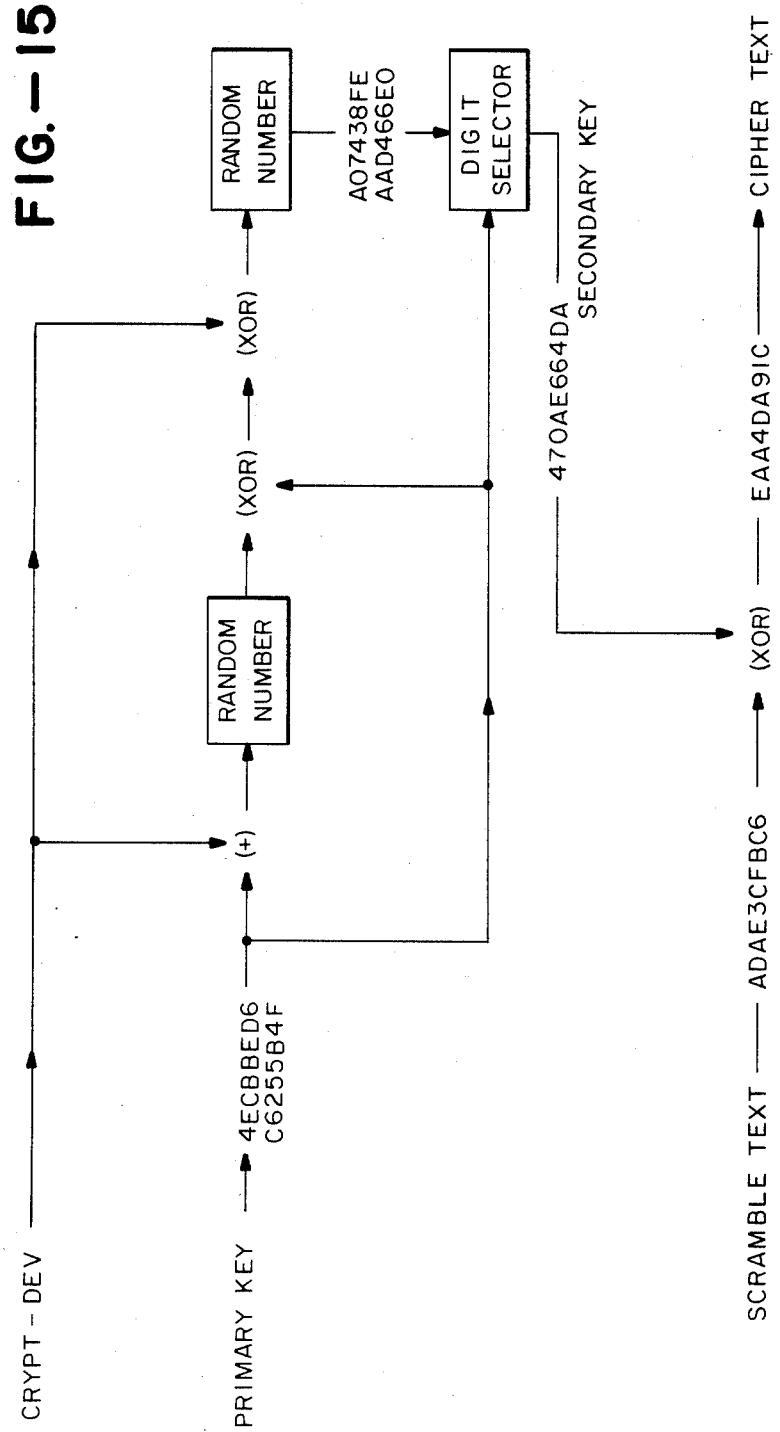

VOICE NETWORK SECURITY SYSTEM

BACKGROUND OF THE INVENTION

The present invention relates to a communication security system, such as a voice network security system. In particular, the present invention is intended for use in transmitting messages between remote locations (e.g., between a first, base station and a second, remote node station) in a voice message system.

In the prior art, voice message systems are widely utilized in conjunction with private branch exchanges (PBX) and/or central office Centrex facilities. Voice messages are stored in a user's "mailbox." In many business applications, a company may utilize voice message systems in several different locations. For example, an ongoing concern may have offices in San Francisco, Chicago, New York and the like. With voice message systems, it frequently occurs that a subscriber will record a message on a local base system and request that it be transmitted or sent to one or more other subscribers at a second, remote node location. A significant problem which is occurring in the transmission of such messages is the interception of those messages by "computer hackers." Such interruptions can affect important messages intended for transmission to a particular subscriber.

Prior art approaches to providing improved security between message transmissions in such voice message system environments usually are that they are far too expensive in providing encryption/decryption techniques which make unauthorized access virtually impossible. While such techniques are available, implementation of such security aspects are quite expensive for operation in a business environment. Other approaches in the prior art of attempting to provide adequate security for voice message systems include use of standard encryption algorithms, which are unfortunately also frequently known to unauthorized users such as computer hackers. Use of such well-known encryption algorithms are per se are unfortunately not entirely adequate for suitable operation in a business environment.

SUMMARY OF THE INVENTION

It is an object of the present invention to provide an improved communication security system, such as a voice message security system.

A voice message security system according to the present invention includes a base station and one or more remotely located node stations.

The invention implements a security system by encrypting all data and control messages. The encryption (and decryption) is organized as part of message transmit/receive protocol. In this way, any product using this system can be configured to take action on detection of an intruder. Such actions may be alerting the sysem manager, disconnecting temporarily or permanentaly (more or less) and other similar actions.

The system uses two initial keys for encryption. At least one of them must be secret and will be made inaccessible to the users. The other could be known by the users (possibly by the public). However, in some cases access to it may be restricted to users with appropriate passwords. Documentation on this file assumes it to be accessible information (such as system serial numbers). A third number, for system identification purposes, can be used with the package, but in this documentation is assumed to be the same as the second key (system serial number).

Two "original" keys are used only at the begining of the communication session to exchange seeds for further key generation by two systems. A second "hand shake" is used to verify the system identifications. This exchange is already secured by the newly generated key. All subsequent messages, data and commands are encrypted and decrypted using continuously generated keys, based on the seed obtained at the first pass.

Encryption organization is such that it modifies both the values and positions of transmitted digits in the message. In this way, it is hoped that the potential intruder will run out of computing power, even if the organization of this system is known to him/her.

The secure aspects of the present invention are achieved by initiating of a first wake up signal to a first one of the node stations. The node station includes means responsive to the wake up signal for transmitting a response ready signal to the base station. The base station includes means responsive to the ready signal for generating a node encryption key which is formed by adding the first node station's identification serial number together with an arbitrarily selected number, both of which are known to both stations.

The node encryption key is used only at the beginning of a communication sequence where the base station generates a special random number, encrypts that number with the node encryption key and transmits that encoded message to the receiving or node station. The receiving or node station decrypts the message and recovers the transmitted random number. This recovered random number becomes a "seed" for generating more random numbers which provide encryption key digits for use in scrambling and encrypting any necessary response messages.

The node or receiving station now generates its own random number and scrambles that second number with the first random number which is then transmitted to the base station. The base station decodes that response and accepts the decoded second random number as a seed for all key digits needed in generating further encoded message to be transmitted to the node or receiving station.

In this fashion, by use of first and second random numbers which are used as seeds for exchanging "messages" between a base and a node station, the present invention provides an improved security aspect which makes it extremely difficult for unauthorized users (i.e., computer hackers) to gain entry into a user's voice message system environment.

Other objects, features and advantages of the preent invention will become apparent from the following detailed description when taken in conjunction with the accompanying drawings.

BRIEF DESCRIPTION OF THE DRAWINGS

FIG. 15 depicts a procedure used to encrypt/decrypt binary formatted text for transmission.

DETAILED DESCRIPTION OF THE DRAWINGS

Figure 1:
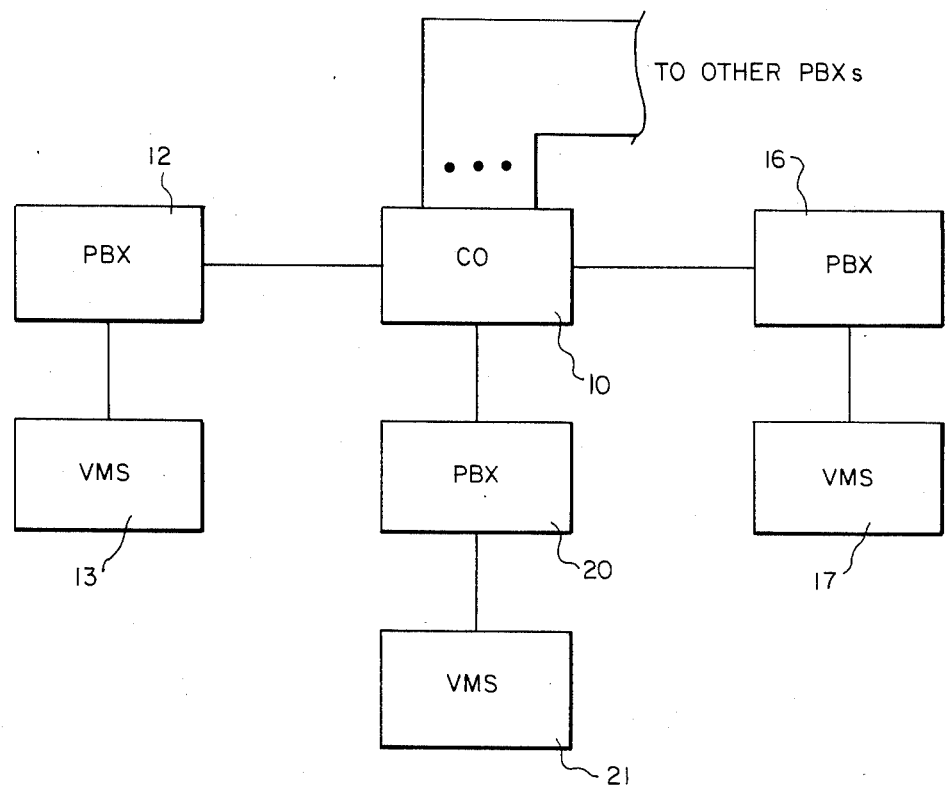
FIG. 1 depicts a block diagram of a typical PBX/VMS communication system known in the prior art.

Referring now to FIG. 1, a block diagram of a PBX/VMS system is described. Although the aspects of such a system are known in the prior art, a brief description of the operation of such a system will be described for providing an overview of the aspects of the present invention.

In FIG. 1, a central office (CO) 10 is connected to a plurality of private branch exchange (PBX) 12, 16 and 20. Each PBX is in turn connected to a voice message system (VMS). For example, PBX 12 is connected to VMS 13; PBX 16 is connected to VMS 17; and PBX 20 is connected to VMS 21. The central office 10 could be connected to additional PBX systems, as illustrated in FIG. 1.

As is known in the prior art, it is possible to store messages in a VMX such as a VMS 13 (which are stored in the user's "mailbox") and later transmit those messages for a designated user to another remote location, such as through CO 10 to PBX 16 for storage in VMS 17.

For example, PBX 12/VMS 13 could be located in San Francisco, Calif., and PBX 16/VMS 17 could be located in a remote location, such as New York City, PBX 20/VMS 21 could be in a different remote location, such as in Dallas, Tex.

It is known in the prior art to intercommunicate between such VMS systems such as depicted in FIG. 1. However, the brief overview as described above is to provide a better perspective of the aspects of the present invention.

Figure 2:
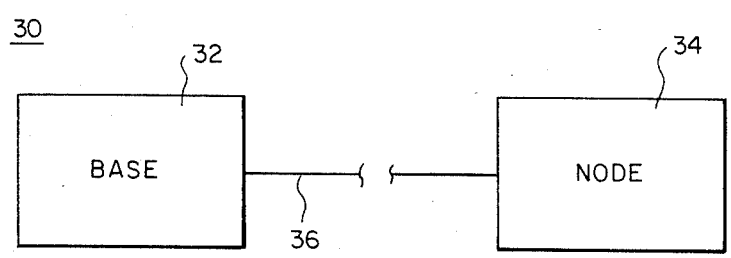
FIG. 2 depicts a block diagram of a communication system incorporating a base station and at least one node station.

Referring now to FIG. 2, a block diagram of communication system 30 is depicted, which includes a first base station 32 and at least one node station 34. Base station 32 and node station 34 can communicate bidirectionally with one another to provide transmission of messages between the respective locations. Communication bus 36 could be any known transmission means, such as conventional telephone subscriber lines, microwave transmission means, fiber optics communication, or any other suitable communication media. It should be further pointed out that any number of node stations such as a node station 34 are to be included in the security aspects of the present invention. The improved voice network security system according to the present invention provides improved security for message transmissions between a base station, such as base station 32, and a node station, such as node station 34 of FIG. 2.

Figure 3:
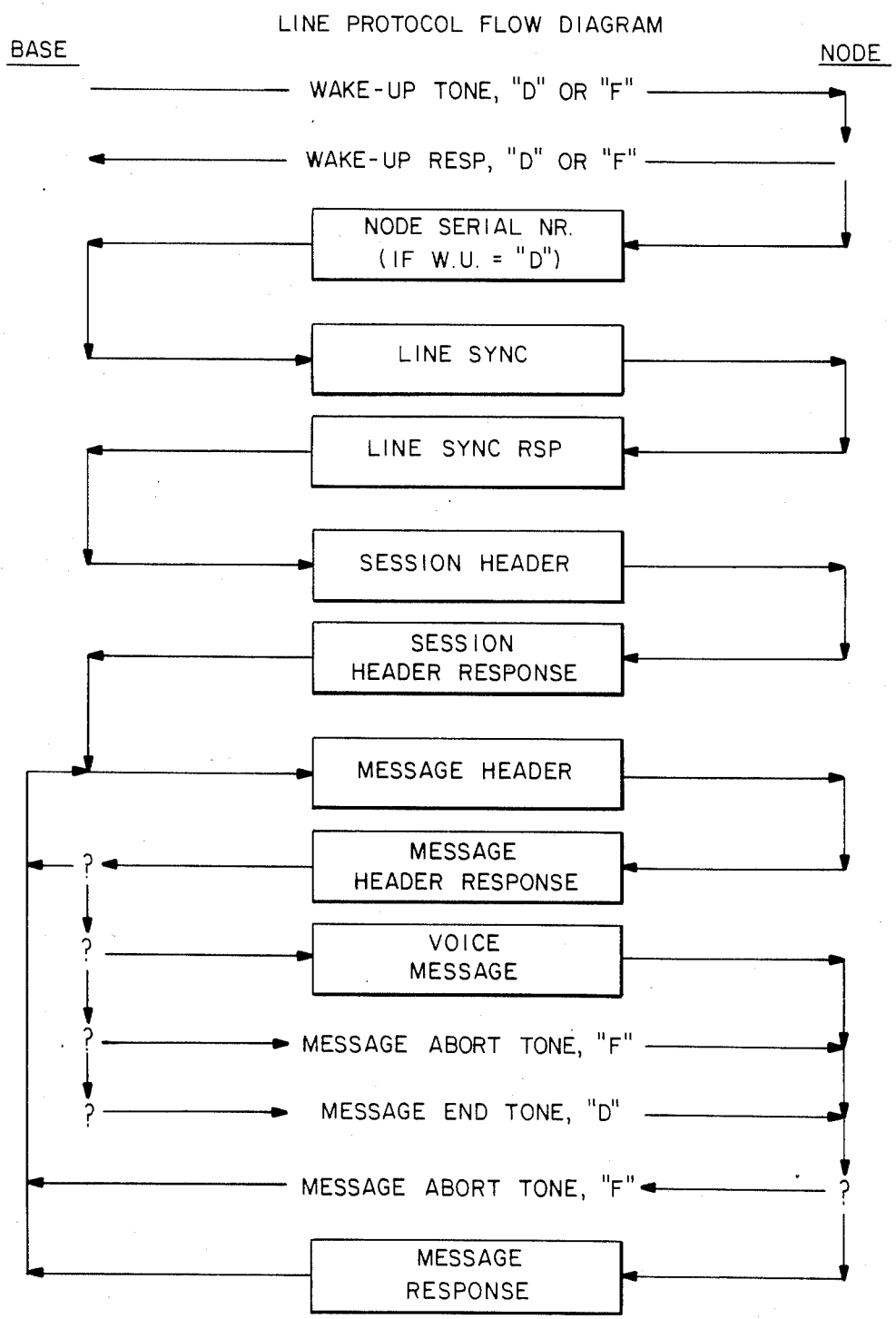
FIG. 3 depicts a flow chart which illustrates the novel sequence of operations for effecting a voice network security system according to the present invention.

Referring now to FIG. 3, a flow chart is depicted which details the sequence of events which incorporate the novel aspects of the present invention. The following description will be taken in conjunction with the flow chart diagram illustrated in FIG. 3 and the communication system 30 depicted in FIG. 2.

In FIG. 3, a line protocol flow diagram is depicted which establishes secure communications between a first base station such as base station 32 of FIG. 2 and a node station such as node station 34 of FIG. 2.

Assume, for purposes of describing the novel aspects of the present invention, that the communication of messages will be transmitted between a base station located in San Francisco and the node station located in New York City.

It is a purpose of the present invention to provide an improved encryption technique between a base station and a node station to deter unauthorized access from the so-called "computer hackers."

The particular encryption technique will be described generally in conjunction with FIG. 3, followed by a more detailed description of the aspects of the present invention.

In FIG. 3, the base station first transmits a wake-up tone of some kind to the node station. The node station, in response to that wake-up tone, transmits a response or ready tone.

When connection between the base station and the node station is made, the encryption/decryption processes are first started by using a "key" previously known to both stations. This key is identified as a node encryption key, and is obtained by adding the receiving station's serial number, which also must be known to both stations, together with an arbitrarily selected number, which is also known to both stations. The arbitrary number could, at least initially, be the same in all stations, and in general must the same for all stations communicating to each other.

The node encryption key need only be used once at the beginning of the communication sequence. The base or sending station generates a special random number, scrambles and encrypts that number with the node encryption key, and then transmits it to the receiving or node station in a message request.

The node or receiving station then does a reverse process, namely decrypting and unscrambling the message. The random number so recovered becomes a "seed" for generating more random numbers. These numbers provide encryption key digits to be used in the scrambling and encrypting process needed for response messages from the node station to the base station.

The node station now generates its own random number and scrambles/encrypts its random number with the recovered random number from the base station. This message is transmitted to the base station, which includes means for decoding the response and accepts or recovers the second random number as a seed for all key digits needed in generating further messages to be transmitted to the node station.

The process then continues as described above, in which both the base station and the node station keep creating two keys. One key is used for transmission and the other key for reception.

Figure 4:
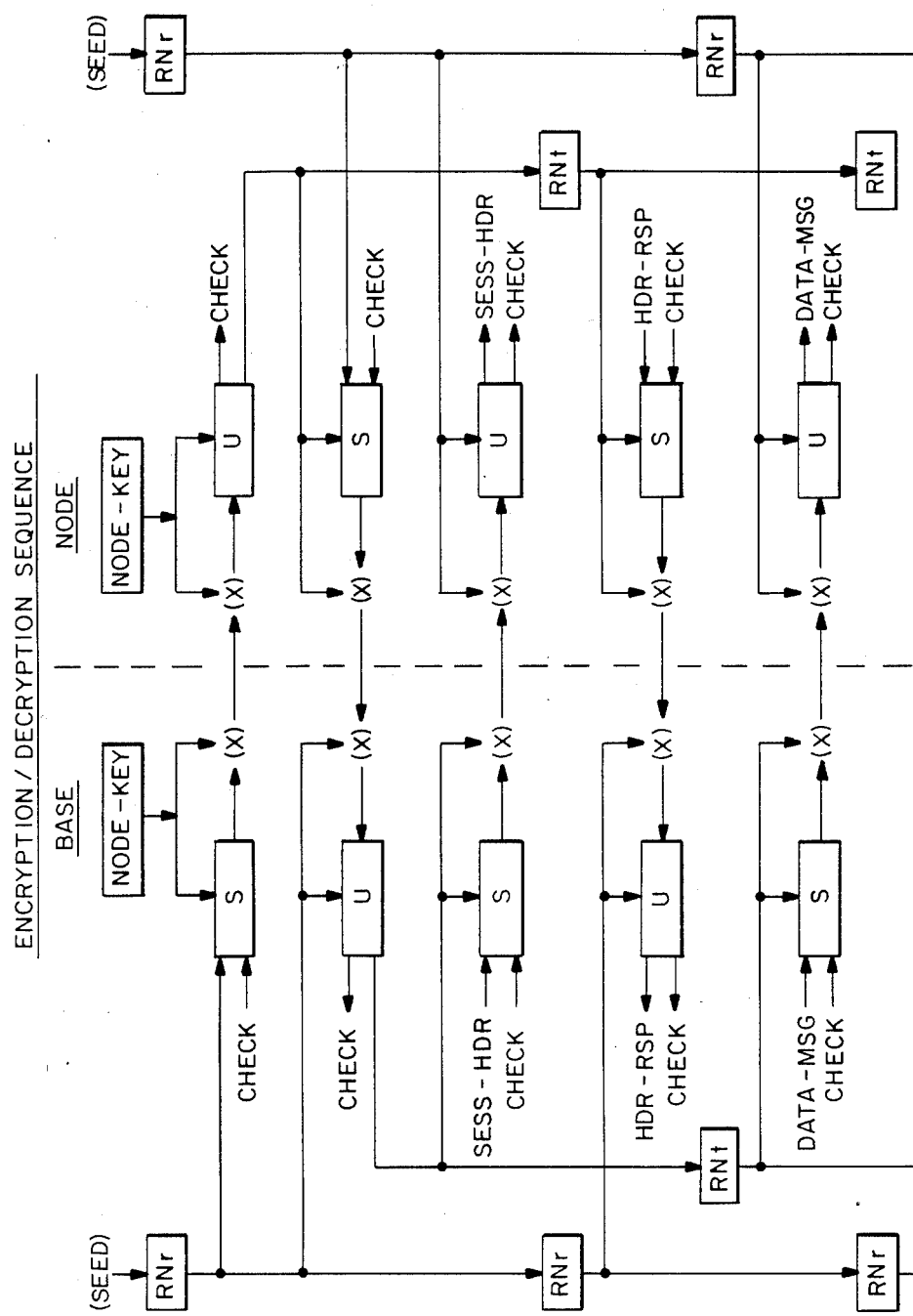
FIG. 4 depicts an encryption/decryption sequence according to the present invention.

Referring now to FIG. 4, when a connection between two stations is made, the encryption and decryption processes are first started by using a key previously known to both stations (Node Encryption Key). This key is obtained by adding the receiving station's serial number, which must be known to both stations, to an arbitrarily selected number, also known to both stations. This arbitrary number could, at least initially, be the same for all stations, and must be the same for all stations communicating with each other.

The node encryption key is used only once at the beginning of communication sequence. The sending station generates a special random number, scrambles and encrypts it with the node encryption key, and then transmits it to the receiving station in a Sync Request "message." The receiver than does a reverse, decrypts and unscrambles the "message." The random number so received becomes a seed for generating more random numbers. These numbers provide encryption key digits to be used in scrambling and encrypting processes needed for for the response "messages."

The receiving station now generates its own random number and scrambles and encrypts it with the random number it received in a Sync Request. It then transmits that back to the sender in the Line Sync Response. The sender decodes a response and accepts the random number as a seed for all key digits needed in generating further cipher text to be transmitted to the receiving station. From then on, both stations keep creating two keys. One is used during transmit and the other during receive.

A checksum is generated for each message and included in the message. The purpose of this is to detect possible attempts to intrude. This checksum could also be used to detect errors caused by bad transmission media conditions. However, it is not recommended since it undermines security alerting mechanism, and may not be best suited for transmission error detection.

Figure 5:
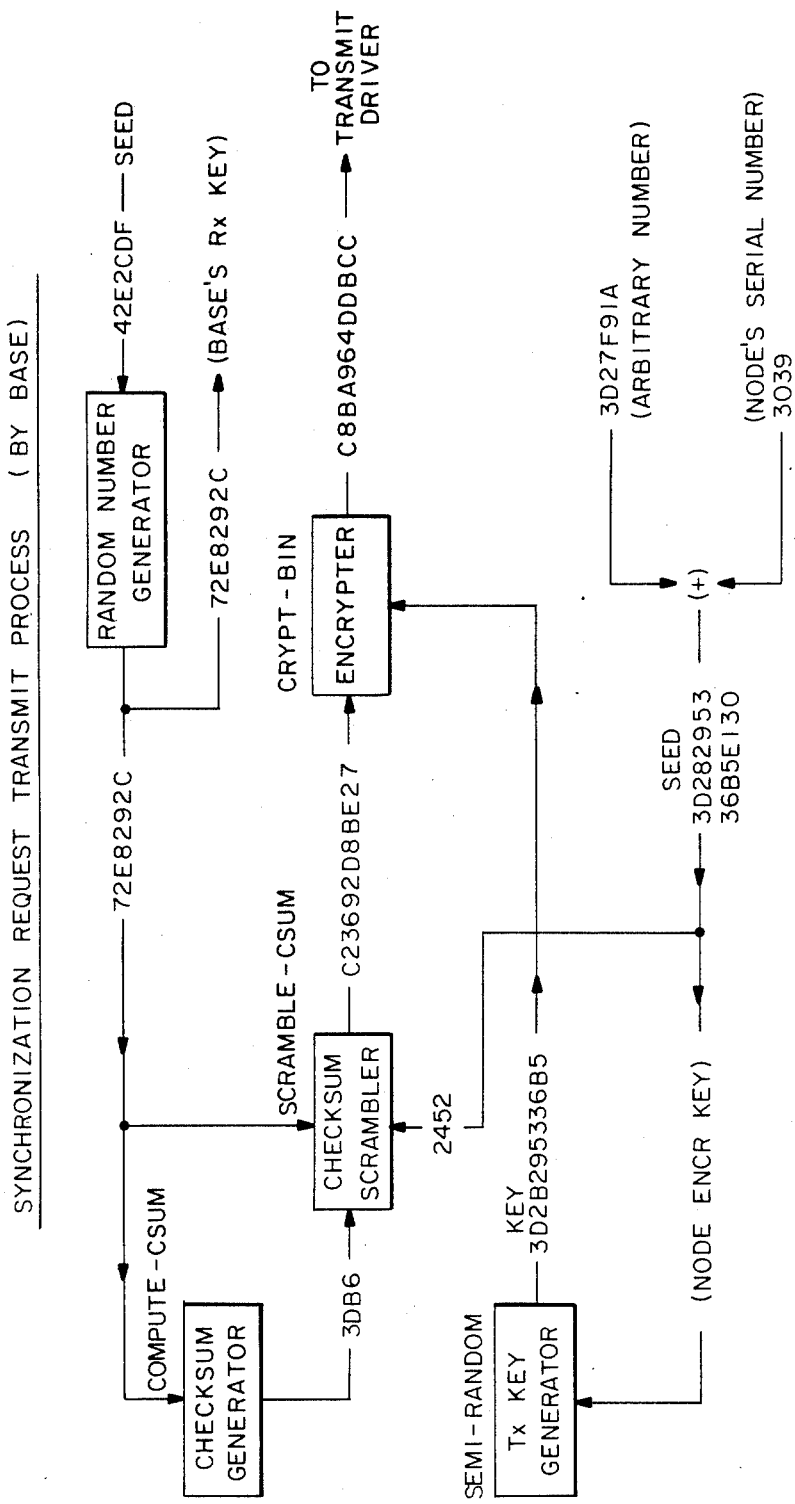
FIGS. 5 and 6 depict the process for synchronization request, transmit and receive, respectively.
Figure 6:
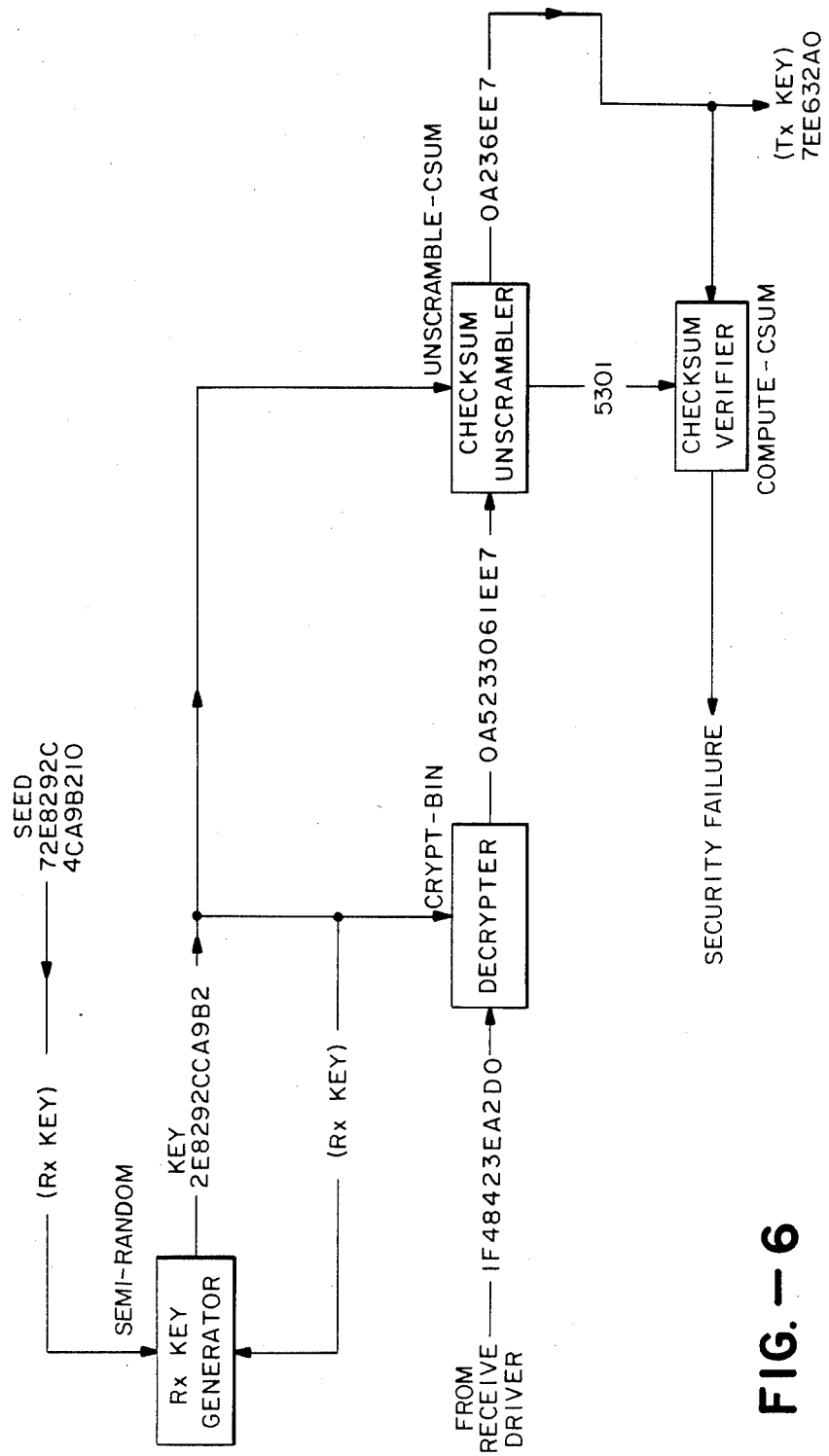

Referring now to FIGS. 5 and 6, this process is used by the base (originating system) to synchronize the encryption sequence between the two systems. A random number is generated and transmitted to the node (responding system). Before transmission, the checksum is generated for the random number. This checksum is then "scrambled into the random number" (digits in the checksum are mixed with the digits in the random number). The combination is then encrypted and transmitted.

The key used for scrambling and encrypting is a sum of group key (an arbitrary number) and the node key, which could be generally known, such as node's serial number, but must be specific to that node.

The random number will be used to initialize base's receive key and node's transmit key for subsequent messages in the session.

Figure 7:
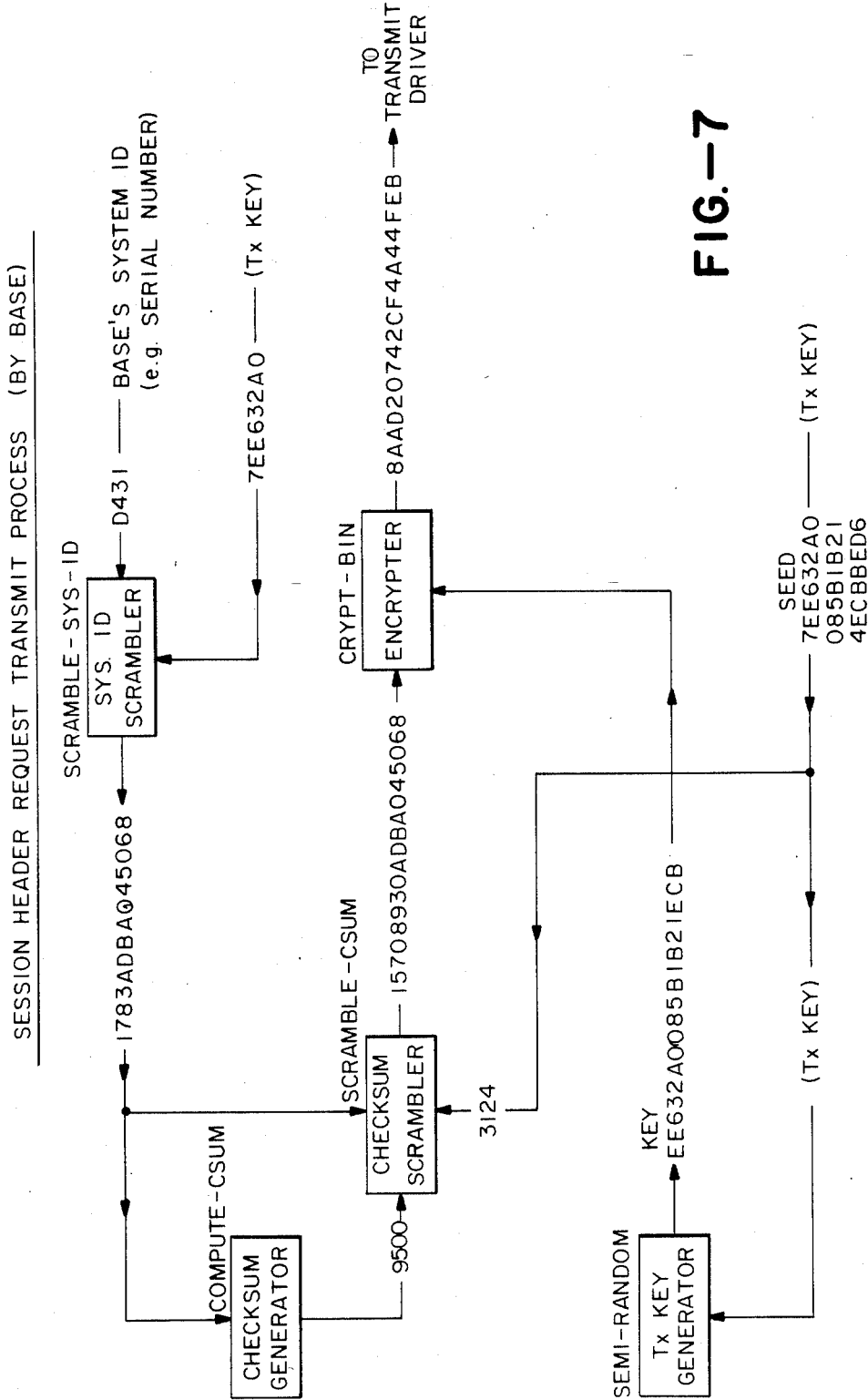
FIGS. 7 and 8 depict the process for a session header request, transmit and receive process, respectively.
Figure 8:
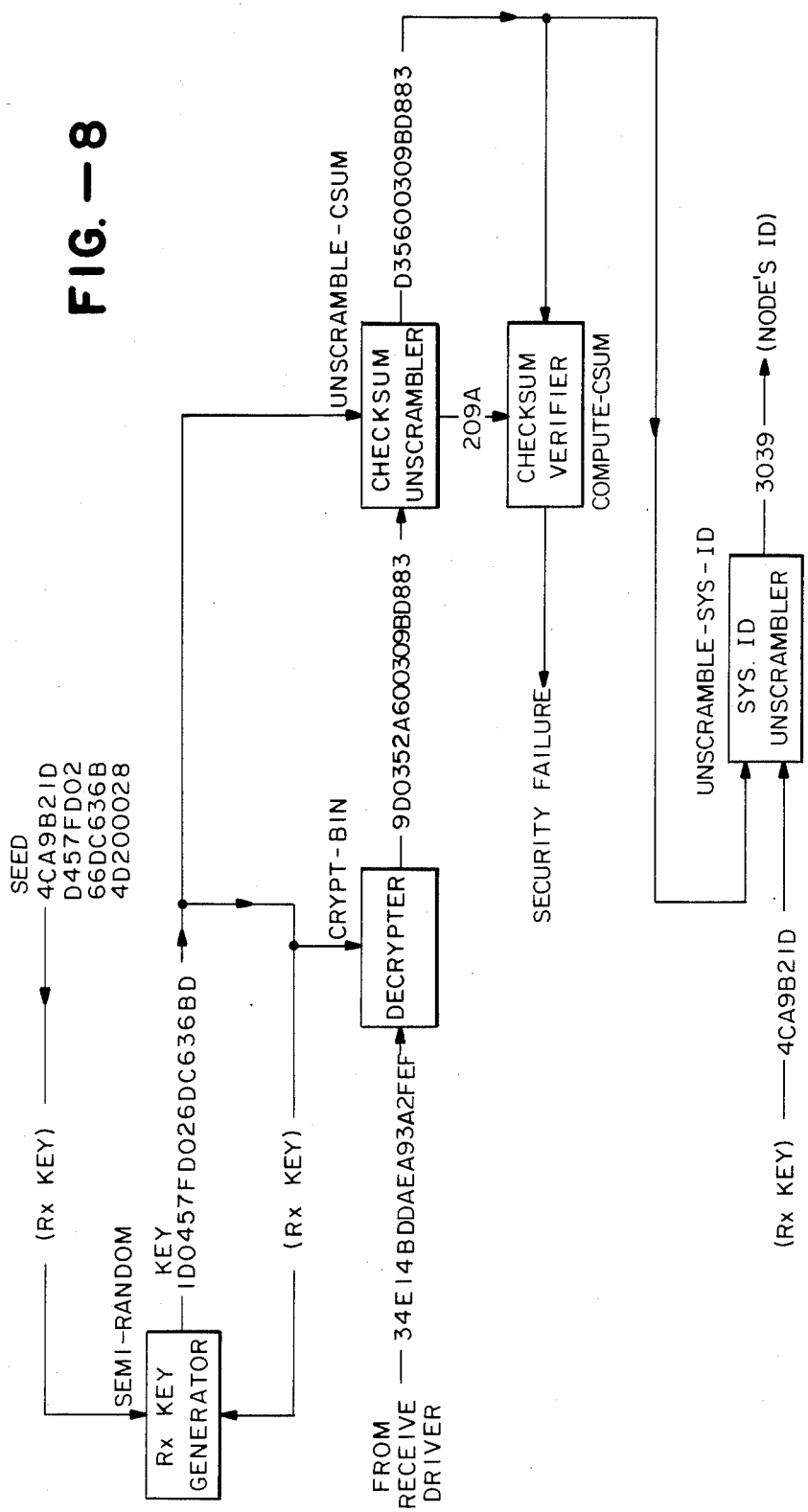

Referring now to FIGS. 7 and 8, this process transmits base's system identification to the node and receives node's system identification. Node's identification is verified to make a final check to determine that encryption sequence has been successfully initiated (i.e., transmitting to correct authorized system).

Figure 9:
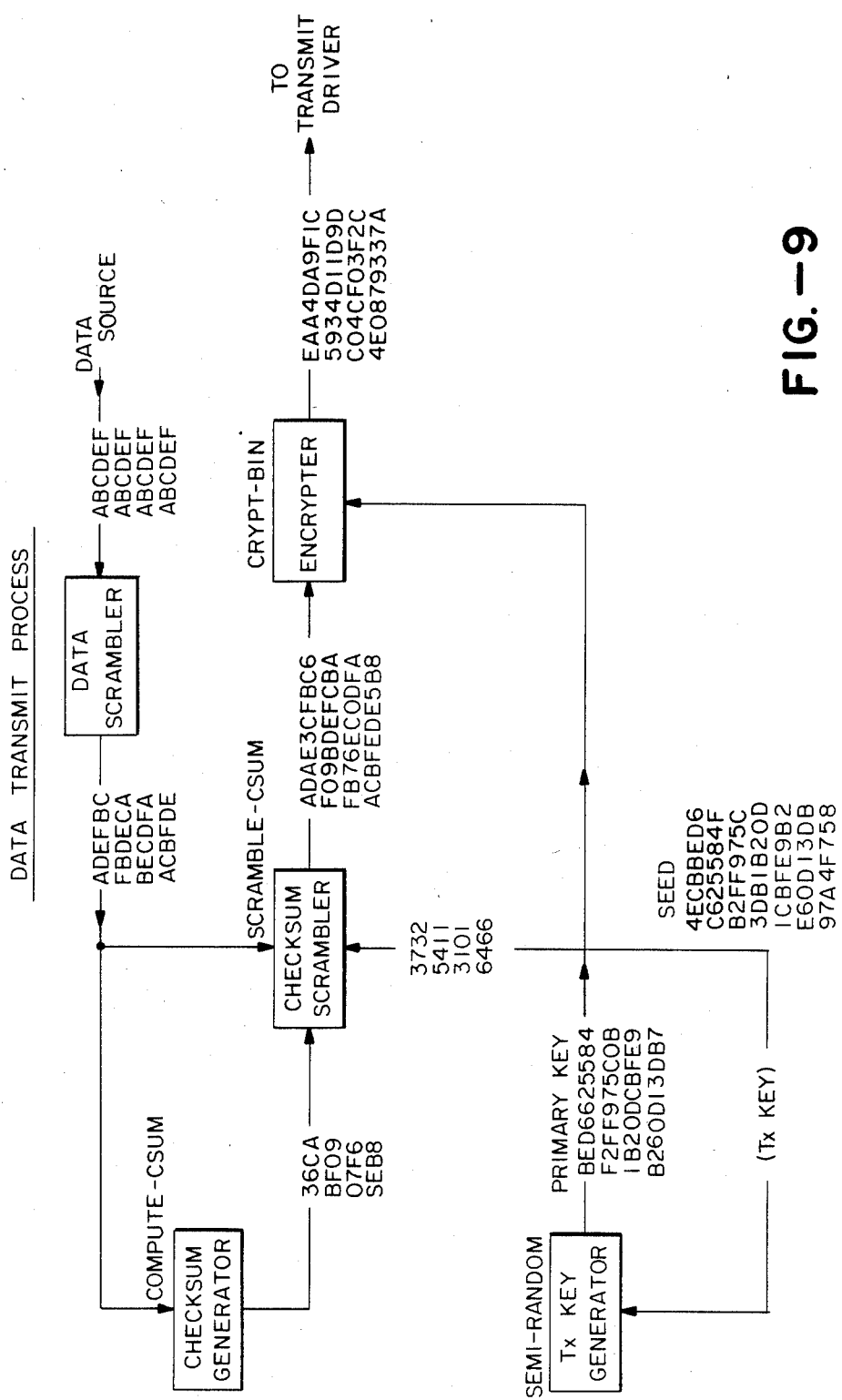
FIG. 9 depicts a data transmit process.

Referring to FIG. 9, this process transmits data type messages. These could be communications protocol control messages or real data messages.

Figure 10:
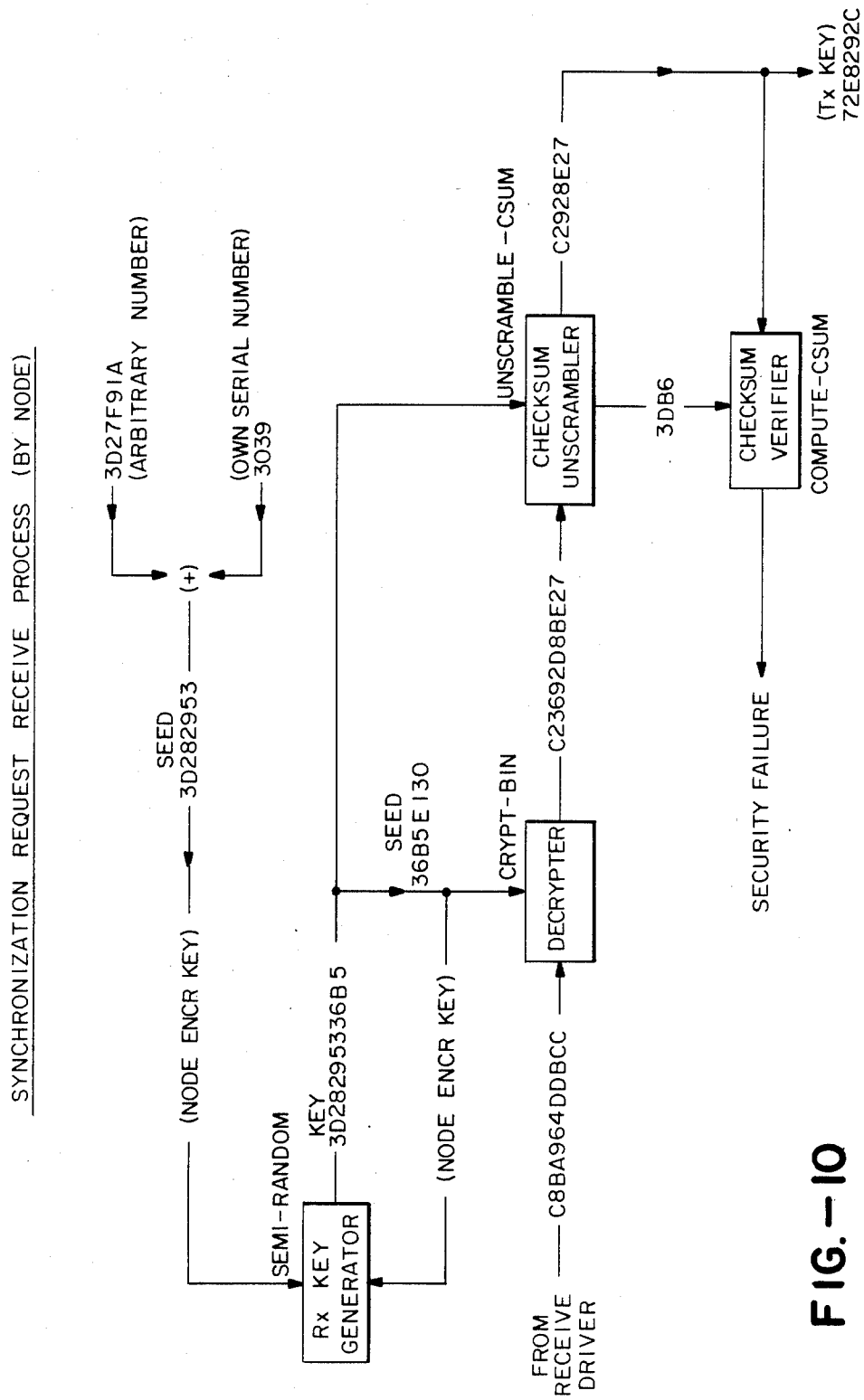
FIG. 10 depicts a process used by the node to synchronize the encryption sequence.

Referring to FIG. 10, this process is used by the node (responding system) to synchronize the encryption sequence between the two systems. A sync request message is received from the base. It is decrypted and unscrambled. The sum of the group key (arbitrary number) and the node specific key (e.g., node's serial number) is used to decrypt and unscramble the message.

The Node Encryption Key, along with the incoming message, is passed to the Decrypter, which decrypts with that key until all digits from it have been used. It then obtains more key from the Key Generator (using the Node Encryption Key as a seed).

The checksum unscrambles and locates the checksum digits in the decrypted message using the Node Encryption Key. It separates the checksum from the message. The checksum will be passed to the Checksum Verifier, which will generate a checksum from the received data digits and compare it with the unscrambled checksum passed to it. Security Failure condition results if the two checksums are different. Received data digits are used to initialize node's Transmit Key.

Figure 11:
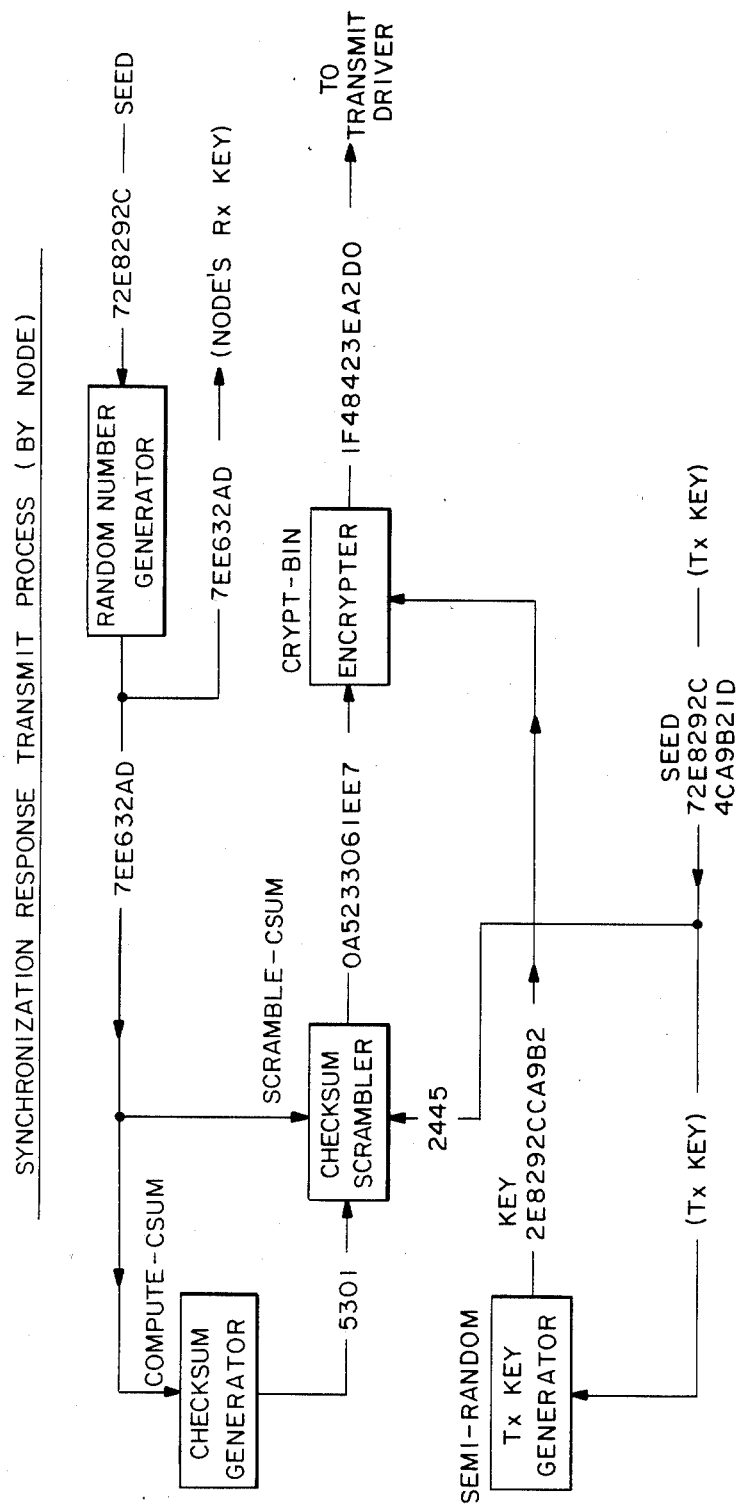
FIG. 11 depicts a synchronization response transmit process by a node.

Referring now to FIG. 11, a random number is generated (by the Random Number Generator) and transmitted to base (originating system). Before transmission, the checksum is generated for the random number. This checksum is then "scrambled into the random number" (digits in the checksum are mixed with the digits in the random number). The combination is then encrypted and transmitted.

The key used for scrambling and encryption is a real Transmit Key just received from the base.

The random number will be used to initialize base's Transmit Key and node's Receive Key for subsequent messages in the session.

Figure 12:
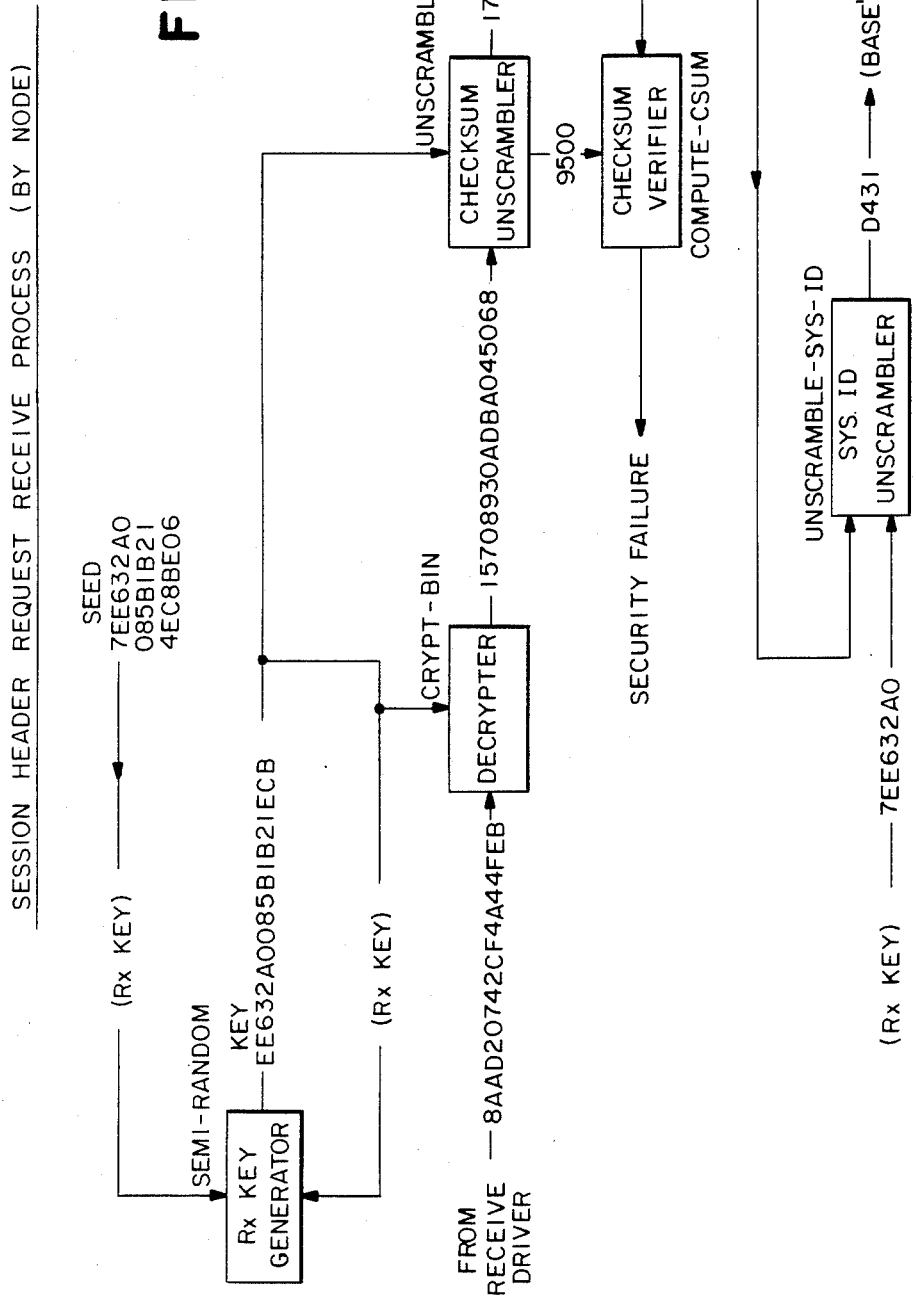
FIG. 12 depicts a session header request receive process by node.

Referring to FIG. 12, this is a session header request process by a node.

Figure 13:
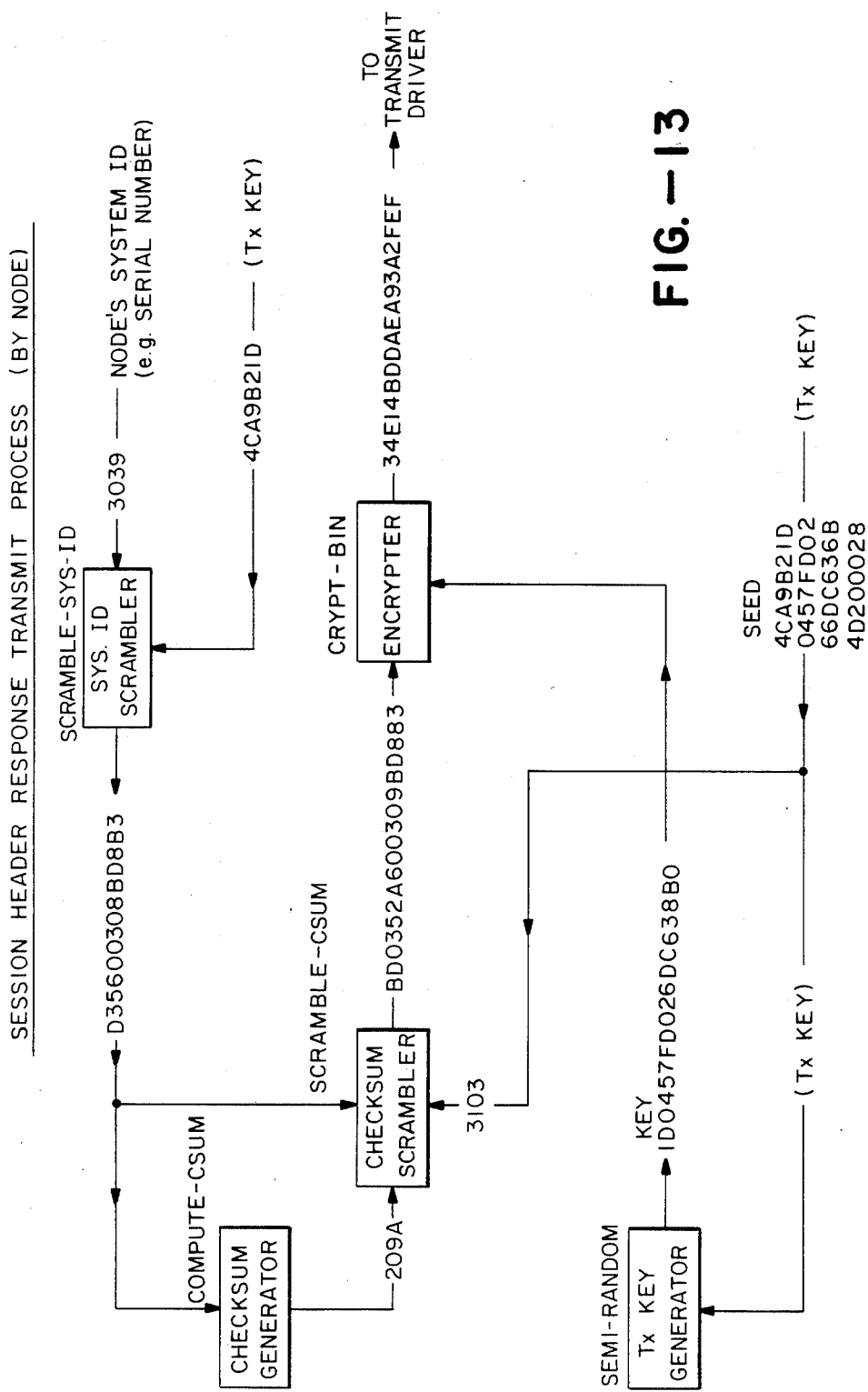
FIG. 13 depicts a session header response transmit process by node.

Referring to FIG. 13, this is a session header response transmit process by a node.

Figure 14:
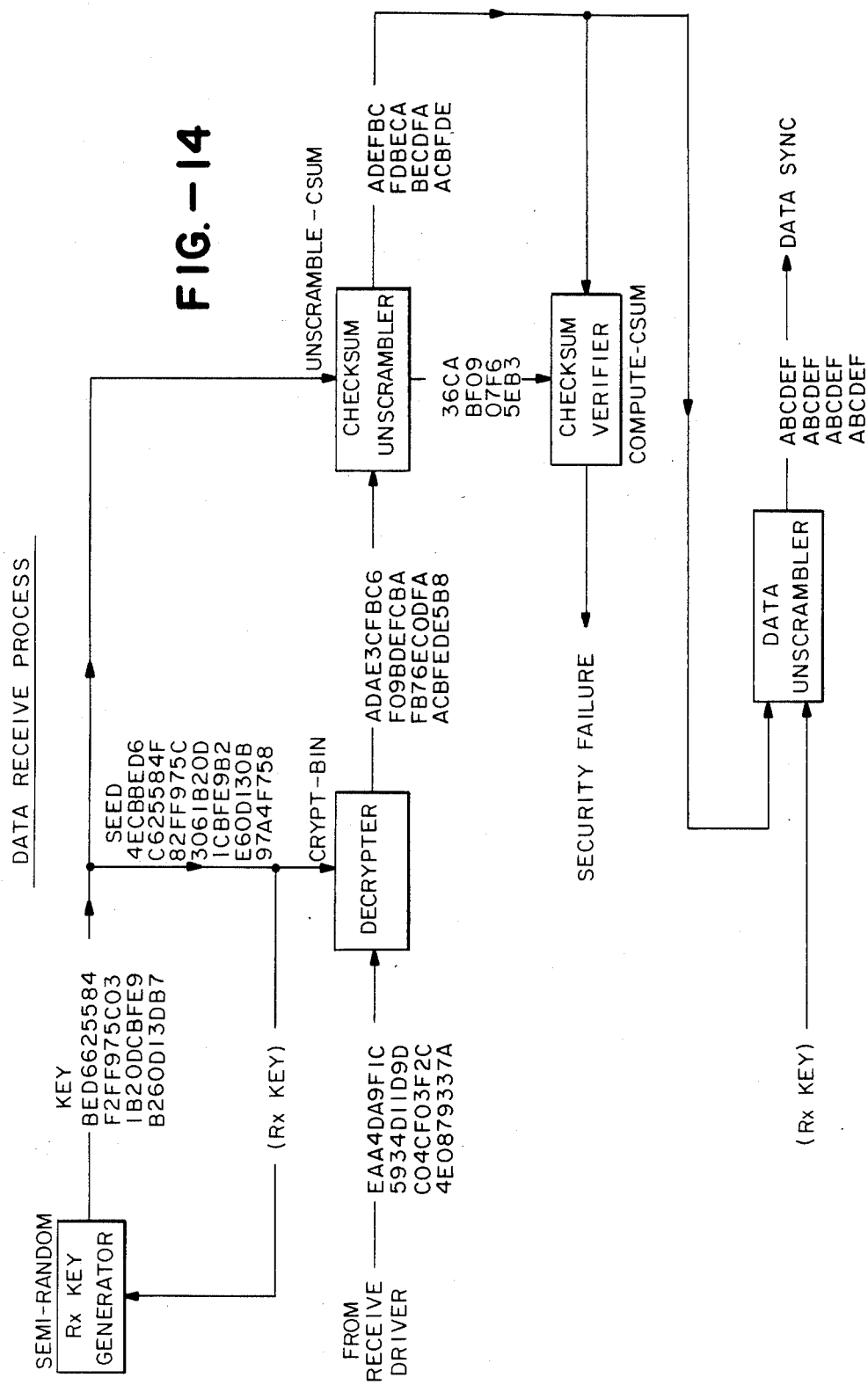
FIG. 14 depicts a data receive process.

Referring to FIG. 14, this is a data receive process.

Referring to FIG. 15, this procedure is used to encrypt and decrypt binary formatted text for transmission on the transmission media. It calls a special random number generator to obtain the encryption key. The random number is saved with the current index in a struct. Index points a group of N-BITS-00 bits in the random number. The struct and its pointer must be supplied by the caller.

A deferred key is obtained by calling the random number algorith twice, with the modified seed each time. This will make recovery of a key (using cipher text and clear text) much harder.

To encrypt/decrypt large amounts of text, the procedure may be called repeatedly. There is no need to prepare the key between calls since the procedure will maintain the key (random number and index) automatically.

A more detailed description of the novel aspects of the present invention is set forth in the accompanying computer program listing attached herewith as Appendix A, the details of which are hereby incorporated by reference.

As can be seen from the foregoing description, the present invention provides an improved security aspect which does not require highly sophisticated encryption algorithms which might not be economically suitable for a business environment.

Further, although encryption algorithms are utilized with the present invention, because of the use of generating first and second random numbers as "seeds" for subsequent transmissions, the message communication process between a base station and a node station provides highly secure message communication which serves to defeat unauthorized access by others. This provides an improved feature over prior art systems in connection with voice message system communication.

What is claimed is:

1. A communication security system comprising
a base station,
one or more node stations,
means for transmitting a first signal from said base station to a first one of said node stations,
said first node station responsive to said first signal for transmitting a second response signal to said base station,
said base station responsive to said second response signal for generating a node encryption key which includes a node identification number of said first node station and an arbitrary number,
said base station further including means for generating a first random number, means for encrypting said first random number with said node encryption key, and means for transmitting said first encrypted random number to said first node station,
said first node station including means for decrypting said encrypted random number to recover said first random number to act as a seed for subsequent encrypted transmissions to said base station, means for generating a second random number, means for encrypting said second random number with an encoding key based upon said decoded first random number to form a second encrypted random number, and means for transmitting said second encrypted number to said base station,
said base station including means for decoding said transmitted second encrypted number to recover said second random number to act as a seed for subsequent encrypted transmissions to said first node station.

2. In a voice network security system including a base station, one or more node stations, means for transmitting a first signal from said base station to a first one of said node station, said first node station responsive to said first signal for transmitting a second response signal to said base station, the method comprising the steps of
generating in response to said second response signal a node encryption key which includes a node identification number of said first node station and an arbitrary number,
generating a first random number, encrypting said first random number with said node encryption key,
transmitting said first encrypted random number to said first node station,
decrypting said encrypted random number to recover said first random number to act as a seed for subsequent encrypted transmissions to said base station, generating a second random number, encrypting said second random number with an encoding key based upon said decoded first random number to form a second encrypted random number, transmitting said second encrypted number to said base station, and
decoding said transmitted second encrypted number to recover said second random number to act as a seed for subsequent encrypted transmissions to said first node station.

3. A voice network security system comprising
a base station,
one or more node stations,
said base station including means for generating a node encryption key which includes a node identification number of a first one of said node stations and an arbitrary number,
said base station further including means for generating a first random number, means for encrypting said first random number with said node encryption key, and means for transmitting said first encrypted random number to said first node station,
said first node station including means for decrypting said encrypted random number to recover said first random number to act as a seed for subsequent encrypted transmissions to said first base station, means for generating a second random number, means for encrypting said second random number with an encoding key based upon said decrypted first random number to form a second encrypted random number, and means for transmitting said second encrypted number to said base station,
said base station including means for decoding said transmitted second encrypted number to recover said second random number to act as a seed for subsequent encrypted transmissions to said first node station.

* * * * *